United States Patent [19]
Donath

[11] 3,844,733
[45] Oct. 29, 1974

[54] TWO-STAGE DOWNFLOW GASIFICATION OF COAL

[75] Inventor: Ernest E. Donath, Christiansted, St. Croix, V.I.

[73] Assignee: The United States of America as represented by the Secretary of the Interior, Washington, D.C.

[22] Filed: Mar. 23, 1972

[21] Appl. No.: 237,454

[52] U.S. Cl.................... 48/202, 48/206, 48/210
[51] Int. Cl. ............................................. C10j 3/16
[58] Field of Search ... 48/202, 210, 77, 204, 197 R, 48/206, 73, 99

[56] References Cited
UNITED STATES PATENTS
3,463,623  8/1969  Forney................................ 48/202
3,746,522  7/1973  Donath................................ 48/202

OTHER PUBLICATIONS
"Computer Study of Stage 2 Reactions in the BCR 2 Stage Coal Gasification Process," Donath, Glenn; American Chem. Society, Sept, 1967, p. 1.

Primary Examiner—S. Leon Bashore
Assistant Examiner—Peter F. Kratz
Attorney, Agent, or Firm—Stanley J. Price, Jr.

[57] ABSTRACT

A process for the two-stage downflow gasification of coal to produce a methane rich fuel gas. In a first stage, partially gasified char recycled from a second stage is reacted with super-heated steam and oxygen to produce a first stage synthesis gas. In the second stage, the first stage synthesis gas is mixed and reacted with coal and steam to produce partially gasified char and a hydrogen-rich product gas containing methane. Pressures in the first and second stages are maintained at at least 50 atmospheres. Slag formed in the first stage reaction is maintained in the molten state at temperatures in excess of 2,500° F. Gases, excess char and slag flow into the second stage in which coal, synthesis gas and steam react whereby the slag is cooled and solidified before it contacts the walls of the reactor in the second stage. After removal and separation of the partially gasified char and product gas from the second stage, the char is recycled to the first stage and the product gas is purified and methanated. The solidified slag is collected in the second stage and is thereafter elutriated with steam and quenched before disposal.

6 Claims, 1 Drawing Figure

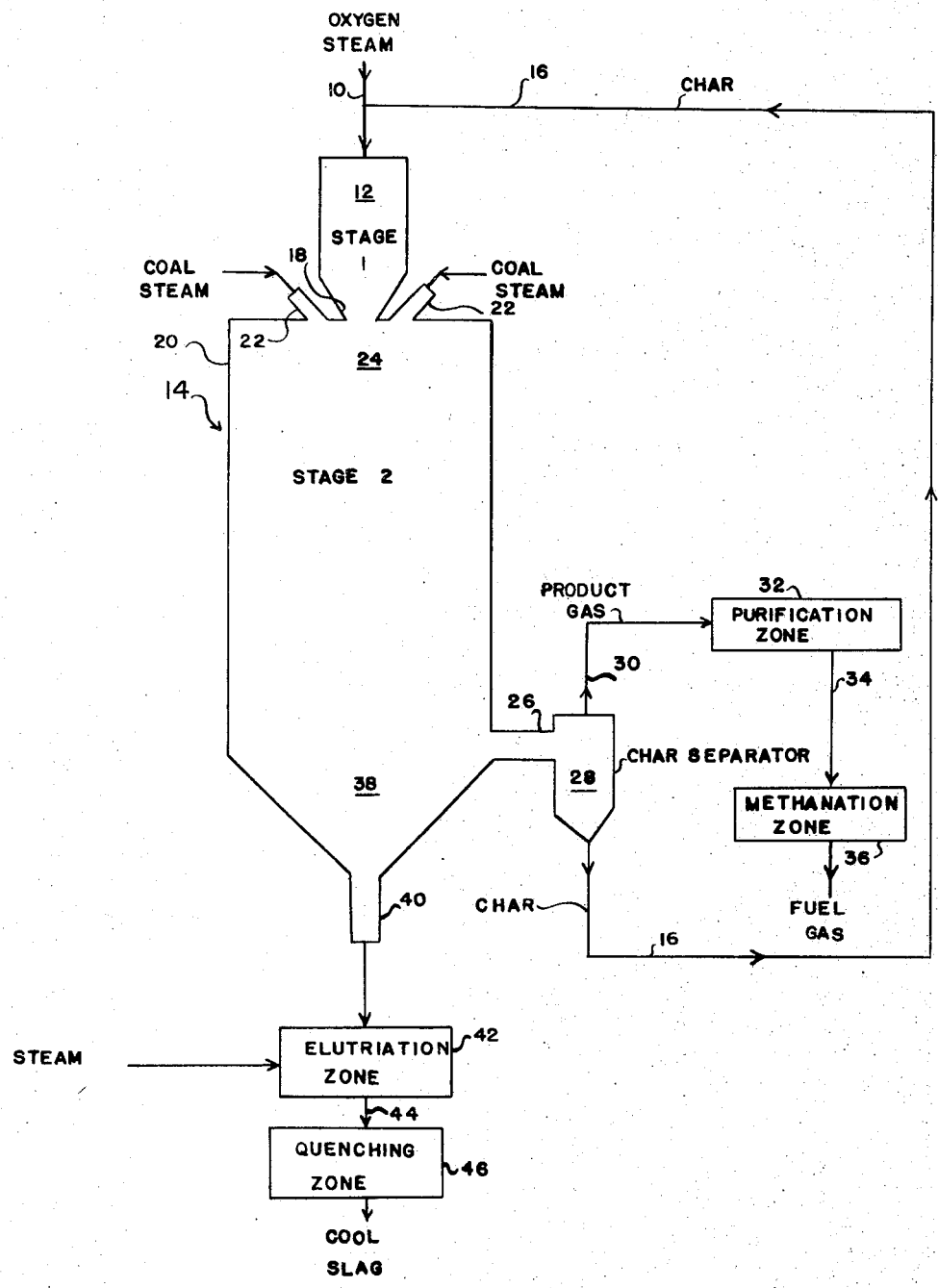

TWO-STAGE DOWNFLOW GASIFICATION OF COAL

BACKGROUND OF THE INVENTION

1. Field of the Invention

This invention relates to a process for the production of methane-rich gas from coal reacted at high temperatures and high pressures in a two-stage gasification process providing for downflow of the reactants through the process.

2. Description of the Prior Art

Methane rich fuel gas is produced by a two-stage gasification process wherein particulate coal and steam are reacted in the second stage with synthesis gas from the first stage at temperatures in excess of 1,600° F. and pressures in excess of 50 atmospheres to produce char and a product gas containing hydrogen, methane and oxides of carbon. The char and product gas are withdrawn and separated and the product gas is thereafter treated to remove carbon oxides and other diluents and is ultimately methanated to produce a methane rich fuel gas. The char is recycled to the first gasification stage for reaction with steam and oxygen at temperatures in excess of 2,500° F. and pressures in excess of 50 atmospheres to produce a synthesis gas containing hydrogen and oxides of carbon for reaction in the second gasificiation stage. A portion of the char, which has low sulfur content, can be burned to produce process energy. Ash produced from the reactions in the first and second stages gravitates to the lower sections of the reactor in stage one where the ash is cooled and removed from the process.

The two-stage gasification process described above was developed at Bituminous Coal Research, Inc., at Pittsburgh, Pennsylvania (BCR). The process is described in a publication of the Department of Interior, Office of Coal Research (OCR), dated 1965 and entitled "Gas Generator-Research and Development Survey and Evaluation." That process was described also in a computer study entitled, "Computer Study of Stage Two Reactions in the BCR Two-Stage Super Pressure Gasification Process," presented at the national meeting of the American Chemical Society, Division of Fuel Chemistry, Chicago, Illinois, in September, 1967.

In the two-stage gasification process described in the above mentioned publications, process gases with entrained coal and char flow upwardly from the first stage through the second stage and must be separated from downwardly flowing molten slag formed from the ash in the reactions. The slag flowing downwardly through the first stage is maintained at low viscosity to assure free passage of the slag into a quenching stage below the first stage. In the quenching stage, the water rate and temperature are controlled to assure the formation of solidified slag which is thereafter withdrawn in a water slurry. The sensible heat lost by the solidifying slag is carried off in the quench water.

SUMMARY OF THE INVENTION

This invention resides in a process for the production of a methane-rich fuel gas by a two-stage gasification of coal in a process providing for downward flow of the reactants and products in the process. In a first gasification stage, downwardly flowing, partially gasified recycle char is reacted with steam and oxygen, at a pressure of at least 50 atmospheres and preferably above 70 atmospheres, to produce a first stage synthesis gas containing hydrogen and oxides of carbon and a slag maintained in the molten state by the high reaction temperature maintained in the first stage. In a second stage, downwardly flowing first stage synthesis gas, partially gasified char and molten slag from the first stage are mixed and reacted with downwardly flowing coal and steam introduced into the second stage to produce a second stage product gas containing hydrogen, oxides of carbon and methane, partially gasified char and slag solidified at the reaction temperature maintained in the second stage. The second stage product gas is separated and treated to remove the carbon oxides and other impurities and is ultimately methanated to produce a methane-rich fuel gas. The char is separated and recycled to the first gasification stage. Solidified slag is collected at the bottom of the second stage for removal and disposal from the system. The residence time of partially gasified char in the first stage and the residence time of coal in the second stage are adjusted and maintained at the conditions of temperature and pressure prevailing in each stage respectively, to assure rapid reaction and heating of the coal at a temperature above its range of plasticity and to assure rapid gasification of the char at a temperature above the ash melting point.

Maintenance of downward flow of the reactants and products in both reaction stages and the rapid mixing and cooling of char and molten slag with coal in the second stage provide rapid solidification of the slag and prevents accumulation of molten slag on the reactor walls in the second stage while providing for efficient transfer of heat from the molten slag to the reacting coal, complete carbon utilization, more effective separation of the slag quenching process from the high temperature first stage reaction, and the recovery of partially gasified char from the elutriated solidified slag.

BRIEF DESCRIPTION OF THE DRAWINGS

The drawing is a diagrammatic illustration of apparatus adapted for use in the two-stage downflow coal gasification process of this invention.

DESCRIPTION OF THE PREFERRED EMBODIMENTS

In the specification, the term "coal" means any carbonaceous material including all ranks of coal, lignite and the like.

The term "gasification" means the heating of coal in the presence of reacting agents whereby all or part of the volatile portion of the coal is liberated and the carbon in residual char is reacted with those reacting agents or with other reactants present in the gasification process.

The term "product gas" means a methane containing gas such as the gas produced in the second stage of the two-stage gasification process described herein.

In the process illustrated in the drawing, oxygen and steam are introduced through a conduit 10 into a first gasification stage 12 of a gasifier 14. A partially gasified recycle char is introduced through conduit 16 into the first stage 12 of gasifier 14 and reacted therein with the steam and oxygen. The reaction in first stage 12 is conducted at a pressure of at least 50 atmospheres and preferably above 70 atmospheres and produces a first stage synthesis gas containing hydrogen and oxides of carbon along with ash and slag. The temperature in first stage 12 is controlled and maintained at a level to assure melting of the char ash to form a molten slag. A preferred temperature in first stage 12 is a temperature of at least 2,500° F. The residence time of char in the first stage 12 is maintained to assure rapid reaction of the partially gasified char at a temperature above the char ash melting point.

The products from first stage 12 flow downwardly therethrough to a mixing stage, or throat 18, converging downwardly toward a second stage 20 of gasifier 14. Steam and coal are introduced into the second stage 20 through nozzles 22 which can be located in throat 18 or in the upper portion of the second gasification stage 20 and which are provided to assure rapid mixing and entrainment in the downwardly flowing first stage synthesis gas and molten slag from first stage 12 of the steam and coal fed through the nozzles 22 in an upper reaction area 24 in second stage 20 near throat 18.

Coal and steam mix intimately and rapidly with the hot first stage synthesis gas and the hot molten slag in reaction area 24 thereby enabling rapid reaction of the entrained coal with the steam and first stage synthesis gas at a temperature above the temperature range of coal plasticity. The residence time of coal in the second stage 20 is controlled to assure the rapid reaction and heating of the coal at a temperature above its range of plasticity. Mixing and contact between the coal and the molten slag in reaction area 24 causes transfer of sensible heat from the cooling molten slag to the reacting coal with consequent greater reaction and utilization of the carbon contained in the coal. Rapid transfer of sensible heat from the slag to the coal causes rapid solidification of the slag in reaction area 24 and prevents contact with, and accumulation of, molten slag on the walls of gasifier 14 in the second gasification stage 20.

The reaction in the second stage 20 is conducted at a pressure of at least 50 atmospheres, and preferably above 70 atmospheres. The reaction temperature in second stage 20 is controlled and maintained to assure rapid and substantially complete reaction of coal and steam with synthesis gas from first stage 12 at a temperature above the temperature range of coal plasticity while assuring rapid cooling of molten slag from the first stage 12. It is preferred that the temperature in the second stage 20 be at least 1,600° F. The reaction in second stage 20 produces a second stage product gas containing methane, hydrogen and oxides of carbon having entrained therein the partially gasified char produced by volatilization of coal. The partially gasified char and solidified slag pass downwardly through second stage 20 with the downwardly flowing second stage product gas for later removal. The maintenance of downward flow of the gases in first stage 12 and second stage 20 provides for more effective and more rapid entrainment in those gases of the downwardly moving char, coal and slag.

The second stage product gas with entrained partially gasified char is removed from the gasifier 14 through conduit 26 to a cyclone separator 28. Separated partially gasified char is withdrawn from separator 28 through the conduit 16 and recycled to the first stage 12 for reuse in the process. Separated second stage product gas is withdrawn from separator 28 through a conduit 30 and introduced into a purification zone 32. In the purification zone 32, the second stage product gas is treated for dust removal, removal of carbon oxides, and removal of hydrogen sulfide and other acid gases and impurities. After purification, the purified product gas is conducted through a conduit 34 to a methanation zone 36 wherein the purified product gas is catalytically methanated to produce a fuel gas containing at least 70 percent methane by volume, and preferably at least 90 percent methane by volume.

Slag, solidified to form granules and other particles in second stage 20, passes downwardly through second stage 20 and accumulates in a slag accumulation zone 38 at the bottom of second stage 20. The slag passes downwardly from zone 38 through a conduit 40 to an elutriation zone 42 into which steam or gas is injected to mix with the downwardly moving slag for elutriation of particles of the partially gasified char from the slag. Steam flowing through the elutriation zone 42 and slag accumulation zone 38 can react with carbon present there to form carbon monoxide and hydrogen. Part of the elutriation steam passes upwardly with partially gasified char entrained therein to the lower portion of second stage 20, where the elutriated partially gasified char mixes with the second stage product gas and is removed through conduit 26 to separator 28. The slag remaining in the elutriation zone 42 passes downwardly with part of the elutriation steam through a conduit 44 to a slag quenching zone 46 where the slag is quenched with water, or other suitable fluid, for further cooling of the slag and subsequent removal of the slag in a slurry with the quenching fluid for ultimate disposal from the system. Because of the substantial cooling of the slag during its passage downwardly through the second stage 20 and its passage through the elutriation zone 42, the temperature of the quenching water need not be as low, and the quantity and rate of quenching water employed need not be as high, as those employed in other two-stage gasification processes.

An example of results that might be obtained through use of this process is as follows.

EXAMPLE

The coal use in the process might have the following analysis:

| Component | % by weight |
|---|---|
| Moisture | 1.3 |
| Carbon | 73.7 |
| Hydrogen | 5.1 |
| Nitrogen | 1.5 |
| Sulfur | 3.7 |
| Oxygen | 7.5 |
| Ash | 7.2 |

This coal can be injected together with steam and a small amount of the second stage product gas used as transport gas (not shown in the drawing) into the second stage 20 of the gasifier 14 and mixed rapidly with the first stage synthesis gas and molten slag obtained by reacting the partially gasified recycle char with oxygen and steam. The exit temperature of the products of the second stage would be 1,750° F. The slag obtained from the elutriation and quenching zones would have a carbon content of 7 percent by weight on a dry basis, corresponding to a loss of carbon of only 0.7 percent.

The second stage product gas would have the following composition:

| Component | % by volume |
| --- | --- |
| Carbon dioxide | 13.5 |
| Carbon monoxide | 44.1 |
| Methane | 16.5 |
| Hydrogen | 23.8 |
| Nitrogen | 0.7 |
| Hydrogen sulfide | 1.4 |

After water-gas shift reaction, acid gas removal, and methanation, the fuel gas composition would be:

| Component | % by volume |
| --- | --- |
| Carbon dioxide | 1.12 |
| Carbon monoxide | 0.08 |
| Methane | 92.2 |
| Hydrogen | 4.7 |
| Nitrogen | 1.9 |

The thermal efficiency from gasifier coal to fuel gas would be 78 percent.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A process for gasifying coal comprising, introducing a partially gasified recycle char into a first gasification zone, introducing oxygen and steam into said first gasification zone, reacting said partially gasified char, steam and oxygen in said first gasification zone at a pressure of at least 50 atmospheres, obtaining as products of reaction in said first gasification zone a first zone synthesis gas comprising hydrogen and oxides of carbon and a molten slag, reacting said steam, oxygen and char in said first gasification zone a temperature sufficient high to maintain in the molten state said molten slag produced in said first gasification zone, moving said products of reaction downwardly through said first gasification zone toward a second gasification zone positioned below said first gasification zone, introducing into said second gasification zone at a location adjacent said first gasification zone coal, steam, said first zone synthesis gas said molten slag, reaction said coal, steam, molten slag and first zone synthesis gas in the second zone at a pressure of at least 50 atmospheres, and at a temperature controlled to assure solidification of said molten slag, reacting said coal, steam, first zone synthesis gas and molten slag at a rate sufficient to solidify said molten slag before said molten slag contacts and adheres to the walls in said second gasification zone, obtaining in said second zone a reaction product comprising partially gasified char entrained in a second zone product gas comprising methane, hydrogen and oxides of carbon, withdrawing said second zone product gas and said entrained partially gasified char from said second gasification zone, separating said partially gasified char withdrawn from said second gasification zone from said second zone product gas withdrawn from said second gasification zone, recycling to said first gasification zone at least a portion of said partially gasified char separated from said second zone product gas, and purifying and methanating said second zone product gas to yield a fuel gas containing methane.

2. A process for gasifying coal as set forth in claim 1 which includes, collecting in a lower portion of said second gasification zone said slag solidified in said second gasification zone, introducing said solidified slag into a quenching zone, cooling said solidified slag in said quenching zone, and withdrawing said solidified slag from said quenching zone.

3. A process for gasifying coal as set forth in claim 1 which includes, reacting said steam, oxygen and char in said first gasification zone at a temperature of at least 2,500° F.

4. A process for gasifying coal as set forth in claim 1 which includes, reacting said coal, steam, first zone synthesis gas and slag in said second gasification zone at a temperature of at least 1,600° F.

5. A process for gasifying coal as set forth in claim 1 which includes, passing said first zone synthesis gas and said molten slag from said first gasification zone through a mixing zone prior to introducing said molten slag and said first zone synthesis gas into said second gasification zone, introducing said first zone synthesis gas and said molten slag into an upper portion of said second gasification zone at a location adjacent said first gasification zone, and introducing said coal and said steam into said upper portion of said second gasification zone adjacent said first gasification zone to assure rapid mixing and reaction of said coal and steam with said molten slag and said first zone synthesis gas.

6. A process for gasifying coal as set forth in claim 1 which includes, collecting in a lower portion of said second gasification zone said slag solidified therein and partially gasified char entrained and collected with said solidified slag, removing from said second gasification zone said solidified slag and said partially gasified char collected in said lower portion thereof, elutriating with steam said solidified slag and said partially gasified char removed from said lower portion of said second gasification zone to remove said partially gasified char from said solidified slag, and returning to said second gasification zone said partially gasified char elutriated by said steam.

* * * * *

PO-1050
(5/69)

UNITED STATES PATENT OFFICE
CERTIFICATE OF CORRECTION

Patent No. 3,844,733      Dated October 29, 1974

Inventor(s) Ernest E. Donath

It is certified that error appears in the above-identified patent and that said Letters Patent are hereby corrected as shown below:

In the Claims:

Claim 1

| | |
|---|---|
| Column 5, Line 44 | After "zone" insert --at-- |
| Column 5, line 44 | After "temperature" delete 'sufficient' and insert --sufficiently-- |
| Column 5, line 53 | After "gas" insert --and-- |
| Column 5, line 54 | Before "said" delete 'reaction' and insert --reacting-- |

Signed and Sealed this sixteenth Day of December 1975

[SEAL]

Attest:

RUTH C. MASON
*Attesting Officer*

C. MARSHALL DANN
*Commissioner of Patents and Trademarks*